United States Patent [19]

Grimm et al.

[11] Patent Number: 5,009,836
[45] Date of Patent: Apr. 23, 1991

[54] METHOD FOR TEMPORARY SHIELDING OF REACTOR VESSEL INTERNALS

[75] Inventors: Noel P. Grimm, Monroeville; James Sejvar, Murrysville, both of Pa.

[73] Assignee: Westinghouse Electric Corp., Pittsburgh, Pa.

[21] Appl. No.: 368,433

[22] Filed: Jun. 19, 1989

[51] Int. Cl.$^5$ .................... G21C 19/00; G21C 11/00
[52] U.S. Cl. .................................. 376/260; 376/287
[58] Field of Search ............... 376/260, 287, 292, 289, 376/291, 262, 263, 308, 463; 250/515.1, 517.1, 518.1, 519.1

[56] References Cited

U.S. PATENT DOCUMENTS

| 3,809,608 | 5/1974 | Katz et al. | 376/308 |
| 4,123,662 | 10/1978 | Fisher | 250/518.1 |
| 4,530,813 | 7/1985 | Jacobson | 376/287 |
| 4,608,495 | 8/1986 | Jacobson | 250/517.1 |
| 4,654,188 | 3/1987 | Hankinson | 376/287 |
| 4,797,247 | 1/1989 | Blaushild et al. | 376/289 |
| 4,859,404 | 8/1989 | Richard | 376/262 |

OTHER PUBLICATIONS

"In Place Thermal Annealing of Nuclear Reactor Pressure Vessels", NUREG/CR 42/2, EGG-125-6708, 4/85.
Letter dates 2/19/88, Miselis to Del George re Soviet Lecture.

Primary Examiner—Daniel D. Wasil

[57] ABSTRACT

A first plurality of water filled shielding tanks is introduced through a nuclear reactor containment building hatch and placed between the stored core internals and the reactor vessel. A support structure for this vertical wall is previously shipped, disassembled, introduced into containment and erected between the reactor vessel and the stored internals. A second plurality of water filled shielding tanks is placed on the containment building operating floor level to cover the stored internals. Once in place, the tanks allow manned activity in the reactor vessel area, such as preparations for annealing. The method includes the steps of: removing the nuclear fuel from the reactor; storing both the upper and lower internals underwater; assembling the support structure and placing same in position in the refueling canal; introducing the vertical and horizontal tanks through the hatch; filling the vertical shielding tanks with water and placing same in the support structure; filling the horizontal shielding tanks with water and placing them above the stored internals and the vertical tanks; draining water from the refueling canal to the level of the reactor vessel flange; performing an operation requiring human intervention such as annealing; flooding the refueling canal to near the operating floor elevation; and decontaminating the tanks and support structure and removing same.

6 Claims, 4 Drawing Sheets

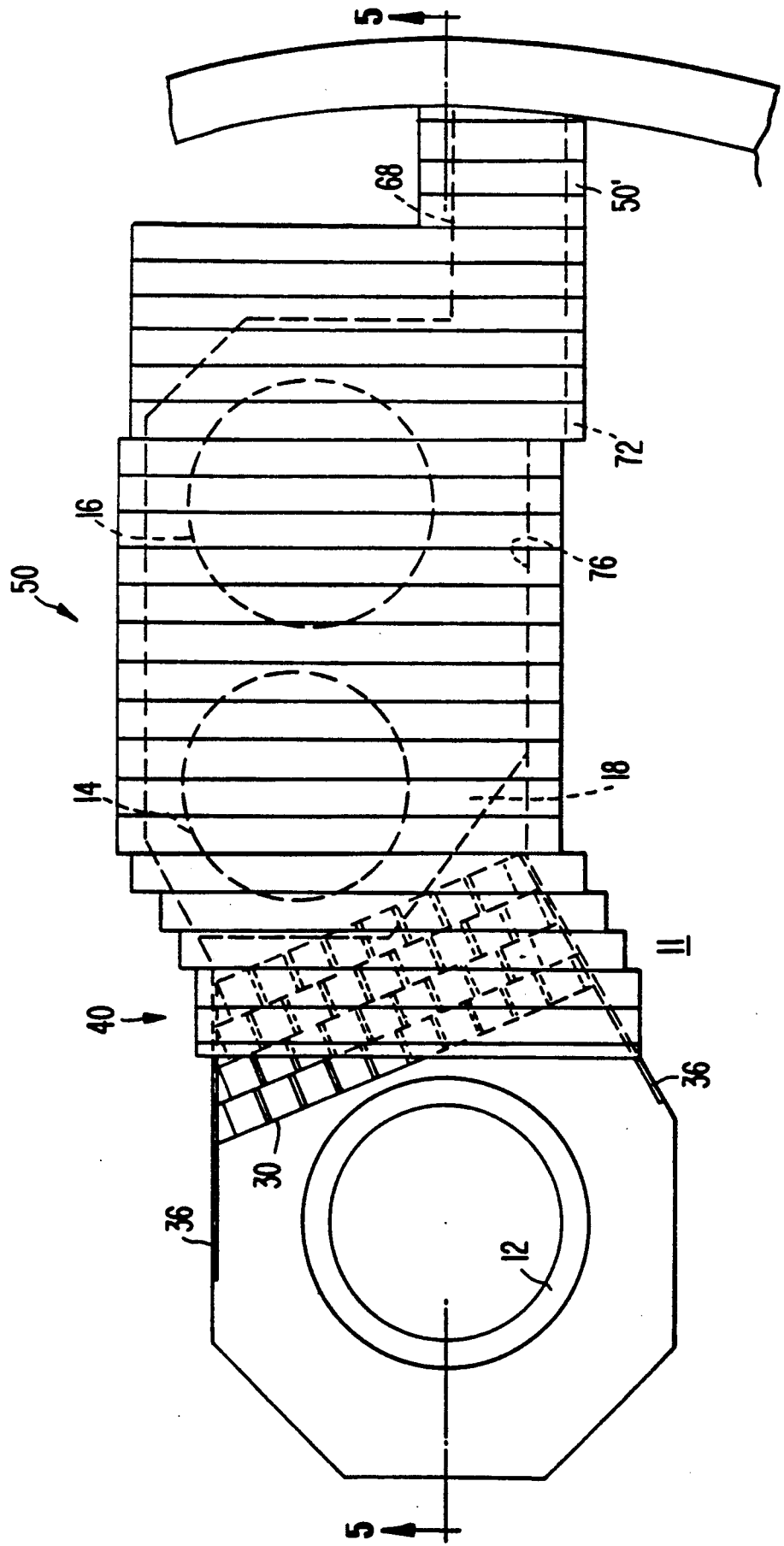

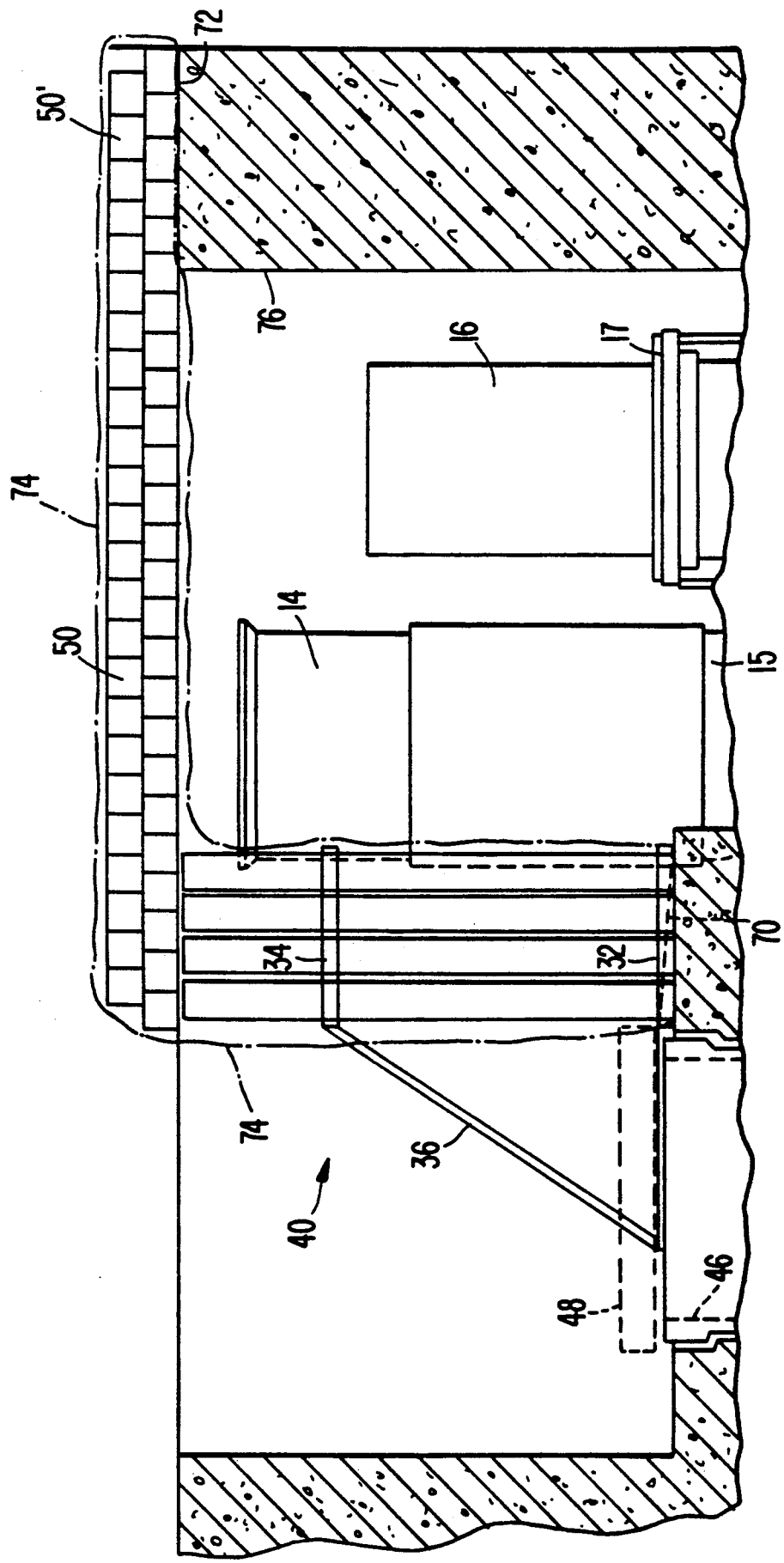

METHOD FOR TEMPORARY SHIELDING OF REACTOR VESSEL INTERNALS

CROSS REFERENCES TO RELATED APPLICATIONS

This application and the following co-assigned, co-pending U.S. patent applications relate to reactor vessel annealing: U.S. patent application Serial Nos. 07/368,454 entitled "Modular Annealing Apparatus For In Situ Reactor Vessel Annealing And Related Method Of Assembly," Bauer and Mavretish; 07/368,635 entitled "Coffer Dam for Temporary Shielding of Reactor Vessel Internals and Method of Assembly," Bauer et al. and 07/368,503 entitled "Annealing Unit Insertion and Removal System," Reiner and Kordaliski.

BACKGROUND OF THE INVENTION

This invention relates to shielding radioactivity emanating from reactor vessel stored internals and, more particularly, to temporarily shielding personnel from the stored internals during operations such as in situ reactor vessel annealing.

DESCRIPTION OF THE PRIOR ART

At various times during the operational life of a nuclear reactor, there is a need to remove the core and internals from the reactor vessel. Such instances include refueling, inspections, reactor vessel annealing etc. During these operations, humans must be introduced into the containment building to make connections, operate tools, etc.

In particular regard to annealing, as a result of constant bombardment by neutron radiation during a nuclear reactor's operation over time, the metal of a nuclear reactor vessel adjacent the reactor core tends to lose its ductility and becomes brittle. Brittleness may lead to cracks forming in the nuclear reactor vessel, particularly when cold water must suddenly be introduced into the vessel cooling system as a result of a malfunction in the system.

It is known that annealing can restore the ductility of the metal so that the useful life of the reactor can be safely prolonged. Annealing is a process of heating and cooling a substance such as steel to make the steel less brittle. In order to avoid the creation of additional stresses, a major portion of the reactor vessel must be annealed.

To perform annealing, the nuclear reactor is shut down, the reactor vessel is opened, the fuel is stored and the reactor upper and lower internals are stored in respective refueling canal positions. Then an annealing apparatus is introduced into the vessel.

Due to the extremely high radiation levels of the stored internals and the reactor vessel, they are normally submerged in water by filling the refueling canal to significantly reduce the exposure to radiation by personnel during the operations involved in the installation of the annealing apparatus and performing equipment maintenance or other operations in the vicinity.

In order to place the annealing apparatus in the reactor vessel and to allow workers to make the necessary heater connections and actuate the thermocouples used for temperature sensing, the region directly above the reactor vessel should be dry. Further, water must be removed from the reactor vessel to reach the required annealing temperature. Removal of this water would remove the radiation shielding from the stored internals in fluid communication with the reactor vessel, resulting in radiation levels too high to permit personnel to work in this area.

One method of temporary shielding is described in EPRI, January 1983, P-2712, entitled "*Feasibility of and Methodology for Thermal Annealing an Embrittled Reactor Vessel*, and NUREG/CR 42/2, EGG-125-6708, April 1985, entitled " *In Place Thermal Annealing of Nuclear Reactor Pressure Vessels*," including seating a cylindrical coffer dam in sealed relation on the reactor cavity seal assembly. The coffer dam extends to the top of the refueling canal. By flooding the refueling canal, the internals are shielded by water.

The problem with any coffer dam is that absolute assurance is needed that the coffer dam seal will not leak and allow water to enter the hot reactor vessel during annealing operations. A water leak during annealing could damage the reactor vessel beyond repair. Because of the enormous consequences of this event, relying on this type of coffer dam seal may not be considered prudent.

A seal between the reactor vessel and the coffer dam is severely limited by materials available to seal between the hot reactor vessel during annealing (850 degrees F.) and the cold water surrounding the coffer dam. If it is desired to locate the coffer dam seal outside and away from the reactor vessel, a suitable sealing surface and sufficiently high sealing force is not available. More particularly, the seal between the conventional coffer dam and the reactor cavity seal assembly is weak because the design merely relies on the weight of the coffer dam to create the seal clamp force.

Further, a coffer dam fabricated in a factory and intended for a large commercial reactor vessel, would be very difficult to transport, since a container suitable for truck or train transport is limited in size.

An additional feasibility concern includes the ability to get the coffer dam as big in diameter as the reactor vessel flange through the containment equipment hatch. The equipment hatch opening is significantly smaller than the diameter of the reactor vessel making entry of a one-piece coffer dam impossible without major modification to the containment structure. Since the containment building must be leak tight to radiation leakage, any openings made would have to be closed by reconstruction and leak tested. Making such a modification is expensive and impractical. If the coffer dam is constructed in segments, as described in the application cited above entitled "Coffer Dam for Temporary Shielding of Reactor Vessel Annealing and Related Method of Assembly," leak tight seals are required between all segments. Any such seals raise the issue of the advisability of using a coffer dam.

In light of the above, a need exists for reliable and relatively easy temporarily shielding of the stored internals, which allows the refueling canal and reactor vessel to be drained of water, eliminates the need for a coffer dam, provides a safe work place for personnel, and which lends itself to relatively easy methods of assembly and disassembly.

SUMMARY OF THE INVENTION

Accordingly, it is a purpose of the present invention to provide temporary shielding using members which can be fabricated in a factory, easily transported to a nuclear reactor, introduced through the equipment hatch of the containment building filled with water and assembled between the reactor vessel and the stored internals.

It is another purpose of the present invention to provide temporary shielding using water filled tanks which can be easily disassembled and removed from the containment building in pieces and a related method of disassembly and removal.

It is another purpose of the present invention to provide temporary shielding and related methods of assembly and disassembly which allow the temporary shielding to be reused at a plurality of reactors.

It is another purpose of the present invention to provide a method of assembly of temporary shielding requiring a minimum of human presence in the containment building.

To achieve the foregoing and other purposes of the invention there is provided temporary shielding of stored reactor vessel internals, including sets of vertical and horizontal shielding tanks. Each of the shielding tanks is sized to fit individually through the containment building equipment hatch. The vertical tanks are individually introduced into the containment building, filled with water and placed between the stored internals and the reactor vessel in a support structure which is shipped disassembled and earlier erected in the containment building. The horizontal tanks are also introduced into the containment building, filled with water and positioned at the operating floor level of the containment building, to cover the top of area where the internals are stored.

The method includes the steps of: storing both the upper and lower core internals underwater in the refueling canal storage area; assembling the support structure for the vertical tanks and placing same in position underwater in the refueling canal between the reactor vessel and the stored internals; introducing the vertical and horizontal tanks through the equipment hatch; filling each vertical tank with water, lowering it by overhead crane and placing it into the support structure; filling each horizontal tank with water and placing it in position above the operating floor; placing a plastic cover over the vertical tanks and the top of the horizontal tanks; draining water from the refueling canal to the level of the reactor vessel flange; performing an operation requiring human intervention, such as annealing; removing the vertical section of the plastic cover; flooding the refueling canal to near the operating floor elevation; removing the remaining top plastic covering; decontaminating the tanks and support structure; and removing same from the containment building.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a top view of the vertical and horizontal tanks in place.

FIG. 5 is a side, cross sectional view of the vertical and horizontal tanks in place taken along line 5—5 in FIG. 4.

DETAILED DESCRIPTION OF THE PREFERRED EMBODIMENTS

The present invention will now be described in detail with reference to FIGS. 1-5.

In these figures there is shown what is known as a typical Westinghouse 3-loop pressurized water reactor (PWR) nuclear power plant. The actual arrangements of nuclear power plants, however, vary by the specific plant. Also, 2-loop and 4-loop PWR plants have similar but different arrangements, as known in the art. The present invention readily can be adapted by those of ordinary skill in the field to all these different plant arrangements, number of loops, plus non-Westinghouse PWR plant designs.

Figure 1:
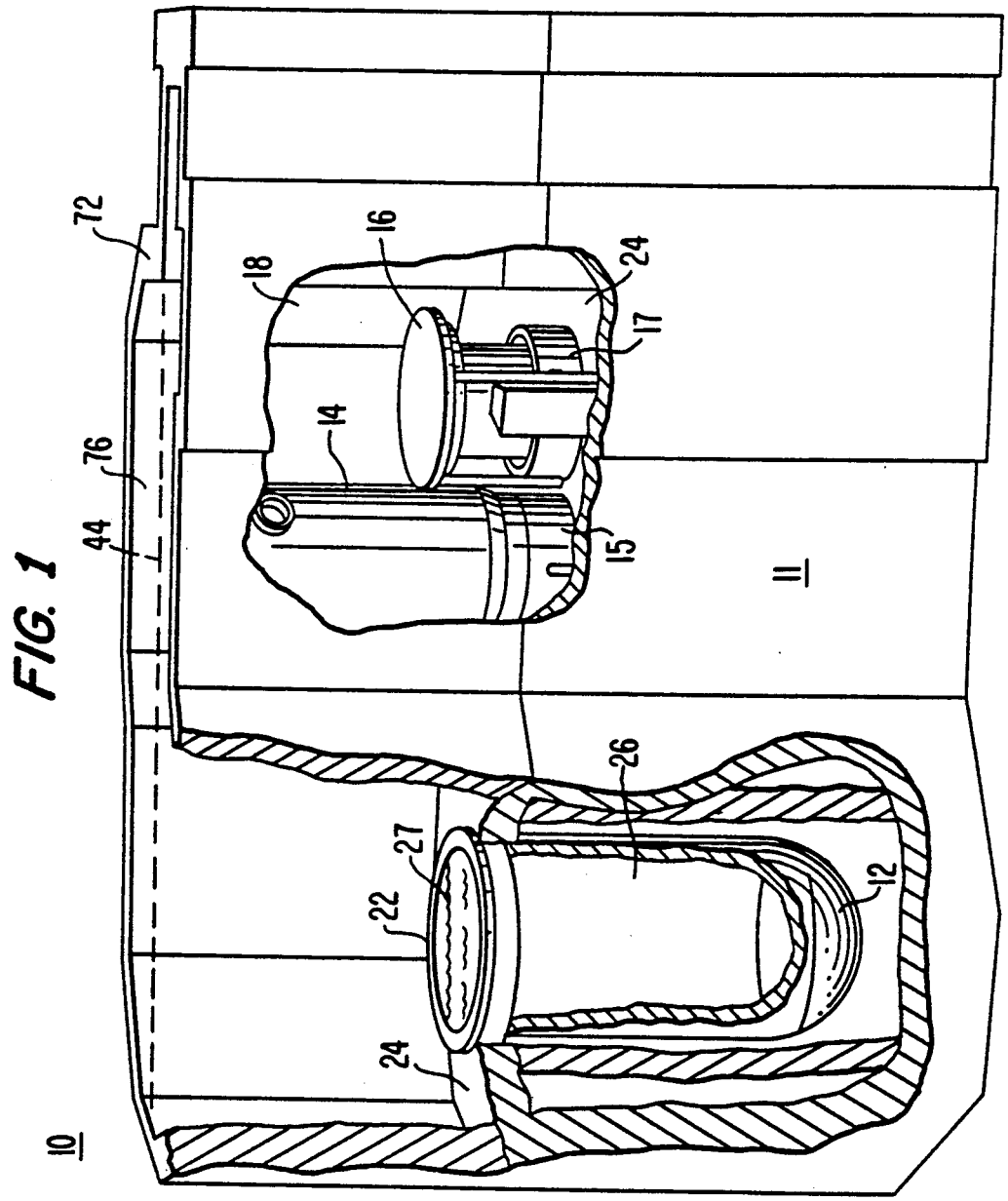
FIG. 1 is a perspective view of the containment building of a nuclear reactor, illustrating particularly, the relative positions of the reactor vessel and the stored internals.

FIG. 1 is a perspective view of the containment building 10 with a cutaway in the front left of a forward concrete wall 11 to show a reactor vessel 12 therein. The reactor vessel 12 is an elongated, generally cylindrically shaped member of a known design for use in a nuclear reactor system. The reactor vessel 12 has the usual hemispherical bottom and inlet and outlet primary system water nozzles (not shown).

In FIG. 1, the reactor vessel closure head (not shown) has already been removed and the radioactive lower and upper internals, 14 and 16, respectively, have been removed and stored. The front right portion of the wall 11 is also cutaway to show the internals 14, 16 in respective storage racks, 15, 17 in a refueling canal storage pit 18. The refueling canal storage pit 18 is located above the vessel 12, with an upper flange 22 of the reactor vessel 12 being generally co-planar with the bottom 24 of the refueling canal storage pit 18.

The vessel 12 condition as shown is with the nuclear fuel and all internal structures removed and is ready for, e.g., in situ annealing. At this time, the refueling water is at maximum level 44 above the reactor vessel 12 and stored internals 14, 16.

Before introducing an annealing apparatus into the reactor vessel 12, precautions must be taken to prevent radiation emitted by the stored internals 14, 16 from being introduced into the reactor vessel area at which the annealing apparatus will be installed and hooked up by human assistance for operation. In this regard, the temporary shielding according to the present invention is used.

Figure 2:
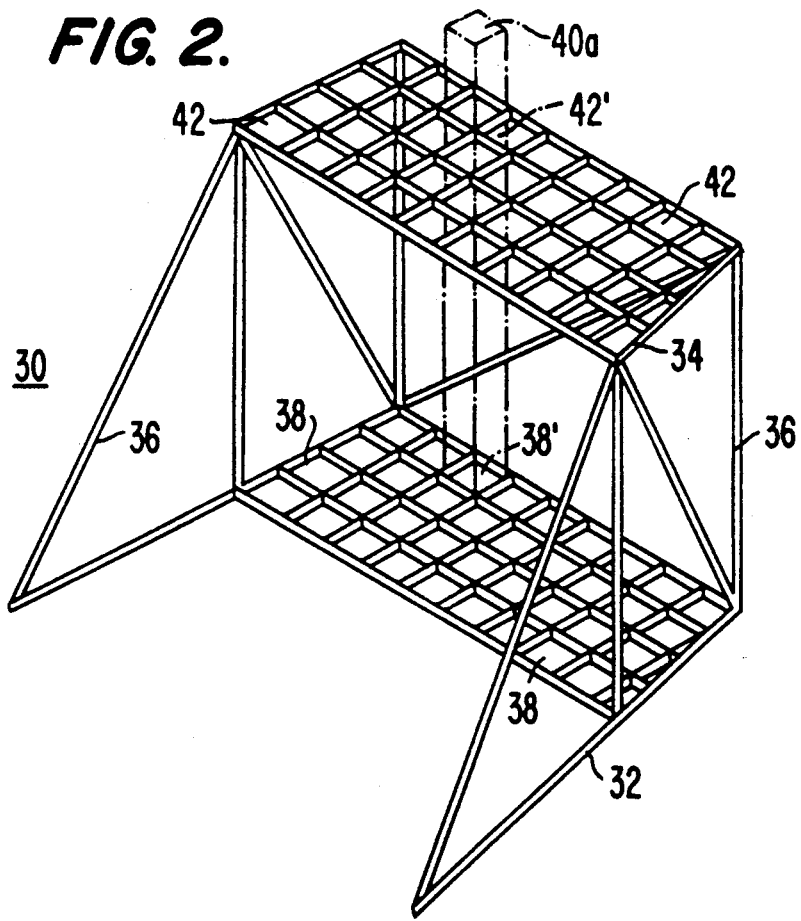
FIG. 2 is a perspective view of the support structure for the vertical tanks according to the present invention, illustrating particularly a square cross section tank (in phantom) being inserted therein.

Referring generally to FIGS. 2, 4 and 5, a first plurality of vertical, water filled shielding tanks 40 is retained by a support structure 30 between the reactor vessel 12 and the stored internals 14, 16, and a second plurality of horizontal water filled shielding tanks 50 is placed over the vertical tanks 40 and stored internals 14, 16.

Figure 3A:
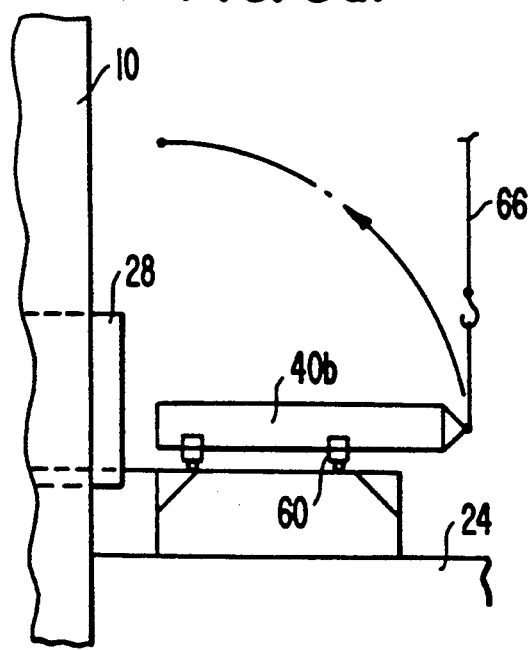
FIG. 3a is a schematic view illustrating introduction of one tank through the containment hatch and uprighting of the tank.

Each shielding tank 40, 50 is preferably relatively rigid and sized to fit through the containment building equipment hatch 28 (FIG. 3a). Each vertical tank 40 is designed to span the distance from the floor 24 of the refueling canal storage pit 18 to the operating floor level 72 of the containment building 10. Each horizontal tank 50 is designed to span the opening 76 in the operating floor 72.

The preferred shape of the tanks 40, 50 is elongated with a square cross section. These tanks 40, 50, however, could be other shapes, such as circular or rectangular in cross section.

Further, the temporary shielding can also be one or more expandable members, as described below.

The plurality of vertical tanks 40 is held in place in the containment building 10 by the support structure 30. As shown in FIG. 2, the support structure 30 includes a lower or floor support grid 32 including openings 38 and an upper support grid 34 including openings 42, connected by intermediate support members 36.

Each opening 38 formed in the lower grid 32 corresponds to and is co-axial with an opening 42' formed in the upper grid 34 to receive and support one of the plurality of vertical tanks 40a.

As shown in FIGS. 4 and 5, the support structure is interposed between the reactor vessel 12 and the stored internals 14, 16.

Positioned below the support structure 30 is a drip pan 70 which catches and directs any water dripping from the vertical tanks 40 away from the reactor vessel 12 and toward the refueling canal storage pit 18.

The preferred embodiment of the plurality of horizontal shielding tanks 50 generally does not require a support structure 30; each is placed directly on top of the operating floor 72 to cover the stored internals 14, 16 and vertical tanks 40.

By providing water filled tanks 40, 50 rather than a solid material, the light weight tanks 40, 50 provide ease of handling and transportation. Further, the shielding tanks 40, 50 can be readily transportable from power plant to power plant, for re-use in, e.g. additional reactor vessel annealing operations.

The shielding tanks 40, 50 and support structure 30 are fabricated of stainless steel with a smooth finish or coated so as to aid in radioactive decontamination.

A plastic cover 74 is placed over the horizontal and vertical tanks 40, 50 to prevent airborne migration of radioactive particles from the stored internals 14, 16 as drying occurs. Separate covers 74 can be used for the vertical 40 and horizontal tanks 50, respectively, if desired.

The lower internals 14 are a highly radioactive radiation source producing radiation fields greater than 1000 Roentgens per hour at a distance of one foot from the surface opposite the core mid-plane location. Radiation fields from the upper internals 16 are approximately one percent of the lower internals 14 value or approximately 10 Roentgens per hour. The temporary shielding tanks 40, 50 according to the present invention reduce these radiation levels to acceptable levels for personnel to perform the annealing operation.

Any additional shielding of the internals 14, 16 is provided by existing concrete wall structures of the containment building, such as wall 11.

For some plant arrangements where there is limited space between the reactor vessel 12 and the area of the refueling canal 18 where the internals 14, 16 are stored, the vertical shielding tanks 40 can be supplemented or made entirely of a more dense material such as steel or lead to provide the appropriate shielding.

In an alternate embodiment, the temporary shielding could also take the form of an expandable container, such as one or more plastic or rubber tanks, that are brought through the containment building hatch 28. For the vertical shielding wall this expandable tank could be lowered underwater into a rack or cage placed between the reactor vessel and core internals, similar to the support structure 30 described previously for the vertical tanks 40. The expandable tank would then be filled with water by a hose connection to the tank. The filled expanded tank would be held in place by the support structure and fill the space between the stored internals 14, 16 and the reactor vessel 12. For the top horizontal shielding wall a supporting structure could be placed to span the opening 76 at the operating floor level 72. Expandable tanks could be placed on this support structure and filled with water to give the shielding needed over the top of the stored internals 14, 16.

Of course, the present invention contemplates a combination of the rigid tanks and expandable tanks, where desired.

The sequence of assembling the temporary shielding water tanks 40, 50 is important to maintain low worker radiation exposure. The method according to the present invention for accomplishing this shielding is described below.

In preparation for annealing the reactor vessel 12, the nuclear fuel (not shown) is removed from the reactor containment building 10. Both the lower and upper internals, 14 and 16, respectively, are stored underwater in the refueling canal storage pit 18 as shown in FIG. 1. The water level 44 in the refueling canal 18 is just below the containment building operating floor 72 elevation, thus covering the internals 14, 16 with water to provide radiation shielding.

The support structure 30, having been shipped disassembled, is then introduced into and erected in the containment building 10 and placed underwater between the stored internals 14, 16 and the reactor vessel 12.

The plurality of vertical shielding tanks 40 is then introduced through the hatch 28 and filled with water, preferably after introduction into the containment building 10. Of course, filling of the tanks 40, 50 could also occur before positioning in the containment building 10, if desired. Filling of the shielding tanks 40 is by hoses with water from a suitable supply either available at the plant or supplied by a vendor. The water should be non-radioactive and of a quality which meets chemistry specifications for reactor coolant system make up water.

More particularly, as shown in FIG. 3a, at the site, a tank 40b is transferred to the interior of the containment building 10 through the containment hatch 28 via, e.g. a dolly, 60. Once inside the containment building 10, the tank 40 is released from the dolly 60 and upended using a crane 66 already in the containment building 10.

Figure 3B:
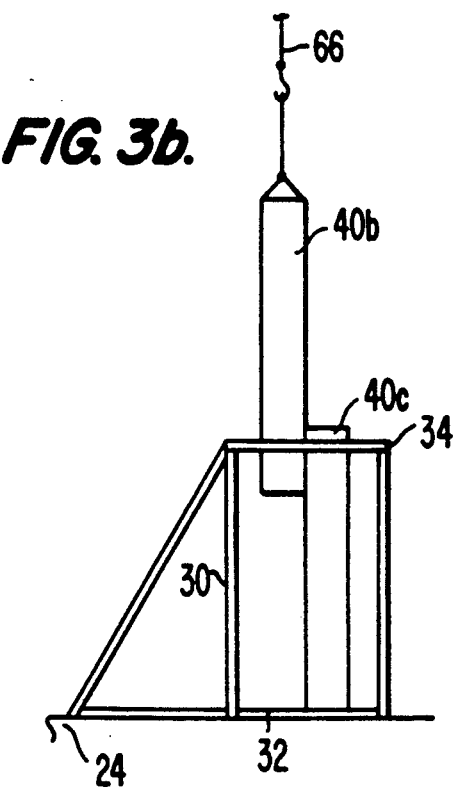
FIG. 3b is a schematic view illustrating the insertion of a tank into the support structure adjacent an earlier inserted tank.

FIG. 3b is a schematic view illustrating the insertion of the suspended tank 40b into the support structure 30 adjacent an earlier inserted tank 40c.

After completing the vertical array of shielding tanks 40, the horizontal shielding tanks 50 introduced into containment just like the tanks 40, filled with water, and placed in position above the operating floor 72 as shown in FIGS. 4 and 5.

Due to a narrow section 68 in the operating floor opening 76, a set of short horizontal tanks 50' are used as seen at the right in FIG. 4.

The plastic cover 74 is placed over the top of the horizontal shielding tanks 50. The cover 74 is deleted from FIG. 4 for clarity. Water is then drained from the refueling canal 18 to about level 27, i.e. to about the reactor vessel flange 22 level. The plastic cover 74 is extended down to cover the outside surface of the vertical shield tanks 40.

The next step in the annealing process is to introduce an annealing apparatus 46, (shown by phantom lines in FIG. 5) into the reactor vessel 12 and pump the remaining water from the reactor vessel 12.

A suitable annealing apparatus 46 is described in the above-referenced application entitled "Modular Annealing Apparatus For In Situ Reactor Vessel Annealing And Related Method of Assembly."

Unmanned insertion and removal of an annealing apparatus relative to a reactor vessel can be accomplished according to the method described in the above-referenced application entitled "Annealing Unit Insertion and Removal System" Reiner and Kordaliski.

After the annealing apparatus 46 is installed in the reactor vessel 12, the reactor vessel 12 is drained of water. Any annealing apparatus 46 should contain a radiation shielding flange 48 that limits exposure to the personnel from the reactor vessel 12.

Workers are then required above the annealing apparatus 46 to make electrical connections and actuate thermocouples (not shown) for the annealing process. The connections are led to a control station (not shown). The shielding tanks 40, 50 and flange 48 provide adequate worker protection from the radiation from the stored core internals and the reactor vessel, respectively.

The vessel 12 is then annealed by heating the internal wall 26 thereof.

After vessel annealing, the reactor vessel 12 is again filled with water and the annealing apparatus 46 removed. The vertical section of the plastic cover 74 is removed. The refueling canal storage pit 18 is then flooded to the level 44 (FIG. 1) near the operating floor 72 and the remainder of the plastic cover 74 is removed from the horizontal tanks 50.

As would be understood by one having ordinary skill in the art, the temporary shielding tanks 40, 50 can be removed from the containment building 10 by merely reversing the steps described above.

The horizontal tanks 50 are sprayed with water over the refueling canal storage pit 18 to remove surface radiation contamination. In order to minimize liquid waste, the shield tanks 40, 50 are sampled to check that no radioactivity is present in the water and the water either drained to a non-radioactive plant drain or returned to its original source. Following any additional decontamination requirements, the empty tanks 50 are then removed from the containment building. In a like manner the vertical tanks 40 and support stand 30 are drained, spray washed, decontaminated and removed.

In this way, the tanks 40, 50 and support structure 30 can be reused by transporting same to other reactors. Further, should these members require repairs, all temporary shielding tanks 40, 50, a single tank 40a or the support structure 30 can be transported back to the factory where the repair can be performed.

The foregoing is considered illustrative only of the principles of the invention. Further, since numerous modifications and changes will readily occur to those skilled in the art, it is not desired to limit the invention to the exact construction and operation shown and described. For example, although the present invention is described as particularly suitable to annealing operations, the invention is also equally applicable to other situations where the internals are stored and some work must be performed in the containment building such as refueling or scheduled inspections. Further, although a plurality of hollow water filled tanks 40, 50 is described, the tanks may be substantially solid as suggested above. Accordingly, all suitable modifications and equivalents may be resorted to that fall within the scope of the invention and the appended claims.

We claim:

1. A method for shielding stored internals from a reactor vessel, comprising the steps of:
   (a) introducing first and second pluralities of shielding tanks through an equipment hatch of a containment building housing the reactor vessel;
   (b) placing the first plurality of tanks vertically between the reactor vessel and the stored internals; and
   (c) placing the second plurality of tanks horizontally above the stored internals and first plurality of tanks.

2. The method as recited in claim 1 wherein the shielding tanks are water filled tanks.

3. A method for shielding stored internals for reactor vessel annealing, comprising the steps of:
   (a) removing nuclear fuel from the reactor vessel containment building;
   (b) removing and storing upper and lower core internals under water in a refueling canal storage area;
   (c) assembling a support structure in the refueling canal between the reactor vessel and the stored internals;
   (d) introducing a plurality of vertical shielding tanks individually through a hatch in the containment building and positioning each into the support structure;
   (e) introducing a plurality of horizontal shielding tanks individually through a hatch in the containment building and positioning each above the stored internals and plurality of vertical tanks;
   (f) draining water from the refueling canal to the level of a flange of the reactor vessel;
   (g) placing an annealing apparatus in the reactor vessel;
   (h) pumping the remaining water from the reactor vessel; and
   (i) annealing the reactor vessel.

4. The method as recited in claim 3, wherein step (f) is preceded by the step of placing a plastic cover over the pluralities of vertical and horizontal shielding tanks.

5. The method as recited in claim 4, further comprising the steps of:
   (j) filling the reactor vessel with water;
   (k) removing the annealing apparatus;
   (l) removing the plastic cover from the plurality of vertical tanks;
   (m) flooding the refueling canal;
   (n) removing the plastic cover from the plurality of horizontal shielding tanks; and
   (o) decontaminating the vertical and horizontal tanks and support structure.

6. The method as recited in claim 5, further comprising the step of:
   (p) removing the vertical and horizontal tanks and support structure from the containment building.

* * * * *